Dec. 9, 1958 J. SCOWCROFT ET AL 2,863,952

ELECTRIC SELECTIVE SIGNALLING SYSTEMS

Filed Sept. 28, 1954 2 Sheets-Sheet 1

INVENTORS
JOHN SCOWCROFT
JOHN HENRY BEESLEY
BY [signature]
ATTORNEY

INVENTORS
JOHN SCOWCROFT
JOHN HENRY BEESLEY
BY [signature]
ATTORNEY 2,863,952

ELECTRIC SELECTIVE SIGNALLING SYSTEMS

John Scowcroft and John Henry Beesley, Coventry, England, assignors to The General Electric Company Limited, London, England Application September 28, 1954, Serial No. 458,938

2 Claims. (Cl. 179—86)

Figure 1:
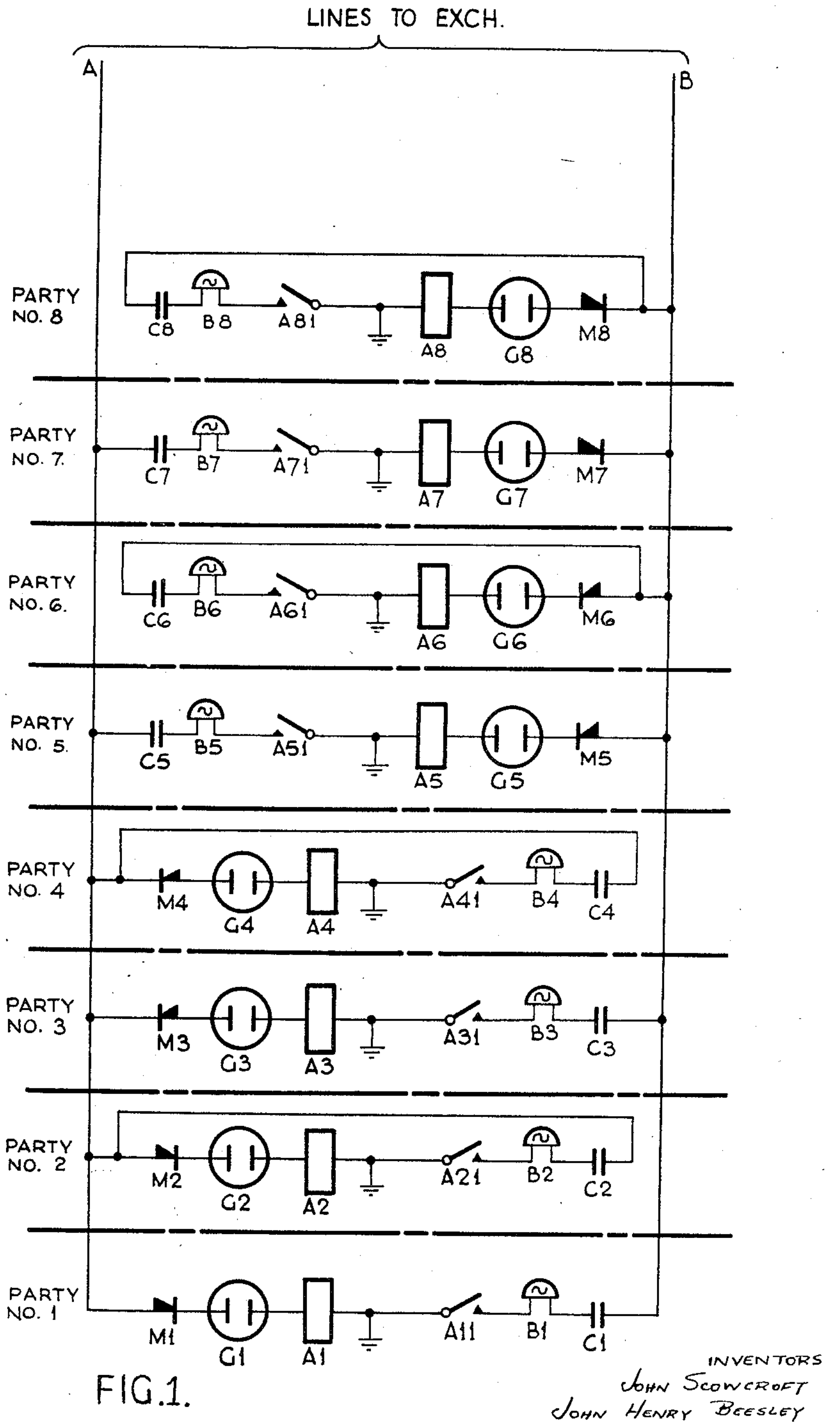

This invention relates to electrical means for selectively signalling or calling any one of a number of stations such as telephone stations, connected in parallel to a pair of line wires, and has for its object the provision of a simple and cheap device at each station whereby the application of a combination of calling potentials to the line is arranged to operate only a single calling device for each combination.

The invention is more particularly applicable to a multi-party telephone line connected to a central battery telephone exchange. As is well-known such multi-party lines comprise two or more telephone instruments connected in parallel to the line wires, and deriving their microphone current from the exchange. Calling is usually effected either by means of code ringing, or some form of selecting device is provided at each subscriber's instrument, the said device being operated by selecting currents such as impulses applied to the line wires.

One object of the present invention is to provide a selective calling scheme for a central battery operated multi-party line of such a character that during speaking conditions no calling devices are left connected in a conductive condition from either line wire to the other, or to earth. This arrangement possesses two advantages; that speech is not attenuated in any degree by the said calling devices, and that line tests for earth faults or the like can be readily carried out without disconnecting apparatus at any subscriber's premises.

According to the present invention, a selective calling system for a multi-party signalling system comprises means for applying characteristic combinations of a relatively high potential of predetermined polarity between one line wire and earth and for applying an alternating potential between a line wire and earth and comprising at each station at least a high potential sensitive device, a polarity sensitive device (which may be combined with the potential sensitive device) responsive to the polarity of the said relatively high potential with respect to earth, and a calling device responsive to alternating current, so arranged that each responds only to one characteristic combination of potentials applied between the line wires and earth.

According to a further feature of the invention a multi-party signalling system comprises means for applying characteristic combinations of a relatively high potential of a predetermined polarity between one line wire and earth, a relatively low potential of a predetermined polarity between the other line wire and earth and an alternating potential between a line wire and earth and comprising at each station a high potential sensitive device, a device responsive to the polarity of the said relatively high potential with respect to earth, a relatively low potential sensitive device, a device responsive to the polarity of the said relatively low potential with respect to earth and a calling device responsive to alternating current so arranged that each calling device responds only to one characteristic combination of potentials applied between the line wires and earth.

At the exchange, arrangements are made to apply momentarily suitable combinations of signalling potentials to the line wires when a subscriber is to be called. Thus either line may be connected to + or — 100 volts D. C. and the same wire or the other to 25 volts A. C. of a frequency suitable for ringing the wanted subscriber's bell. The line not connected to 100 volts may be connected to + or — 50 volts D. C. if sixteen subscribers are to be catered for.

Although a gas tube has been described as being a suitable voltage-sensitive device, elements such as silicon carbide may be used and although a rectifier is described as being a suitable polarity sensitive device, a polarised relay may be employed as an alternative to the rectifier and associated relay.

Since the contacts of the relays in series with the gas tubes are connected in series either with bells or with the low voltage relays (in which latter case the low voltage relays have contacts in series with the bells) removal of the high potential condition from whichever line wire is carrying it, causes disconnection of all switching apparatus from the line wires and hence removes all possible leakage paths for speech currents between the said wires, or from the wires to earth.

Figure 2:
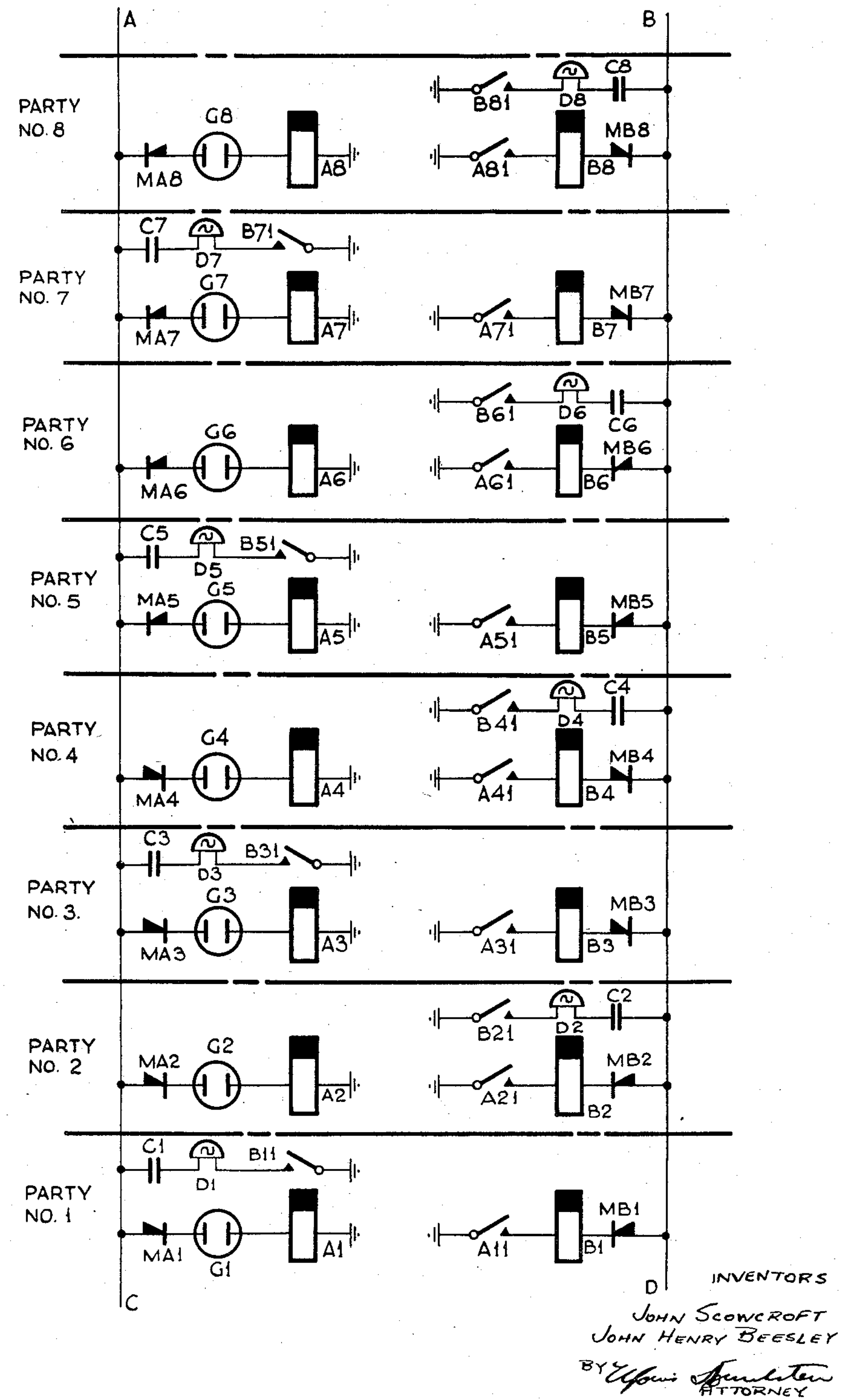

Two arrangements in accordance with the invention will now be described with reference to the accompanying diagrammatic drawings in which Figure 1 shows the calling circuits of an eight party line, and Figure 2 shows the calling circuits of eight parties on a sixteen party line.

Referring to Figure 1, it will be seen that the figure is divided into eight sections. Each section shows the circuit employed to deliver a selective calling signal to the associated party line subscribed. The apparatus involved in any one calling circuit is the same as that in all the others, but the circuit connections are so arranged and the calling signals are of such a nature that only one bell out of the eight can be rung with any one given signal. It should be understood that only the calling apparatus is shown; each telephone sub-station also comprises a microphone and receiving apparatus, with or without means for directing impulses to the line wires if the exchange is automatic. As the invention is concerned only with selective calling, none of the remaining apparatus at any sub-station is shown, but it should be understood as being connected across the line wires when in use and disconnected therefrom by cradle switch contacts or the equivalent when not in use.

Referring to the lowest division of the figure, it will be seen that the apparatus at the station of party No. 1 comprises a rectifier M1, a gas diode G1 and a relay A1 connected from one line wire in series to earth. The other line wire B is connected via capacitor C1 and alternating current bell B1 to the contact A11 and earth. Similar equipment which is correspondingly referenced with the station reference is provided at the other stations 2, 3 and 4 whilst at stations 5 to 8 inclusive the rectifiers M5 to 8, gas tubes G5 to 8, and relays A5 to 8 are connected between the line wire B and earth. At stations 2 and 4, the bells B2 and B4, condensers C2 and C4, and contacts A21 and A41 respectively are arranged to be connected between line wire A and earth.

Similarly at stations 6 and 8, the bells B6 and B8, condensers C6 and C8 and contacts A61 and A81 are arranged to be connected between line wire B and earth.

It will be appreciated that both lines are isolated from earth at all the stations since the lines are isolated either by connection to gas tubes which are normally non-conducting, or to relay contacts which are open. This means that each line wire can be tested individually from the exchange for earths or short-circuits without requiring disconnections to be made at any of the subscribing parties' premises, and without sending false calling signals.

In order to call say party No. 1, a potential high enough to break down the gas tube G1 and cause it to become conductive, is applied from the exchange between the line A and earth. This potential is also of such a polarity, i. e. positive, as to make the rectifier M1 conductive. This potential is applied for the time for which a calling condition is required. The current which results through M1 and G1 operates relay A1. At times other than the calling period a lower potential for speaking or impulsing purposes may be maintained on the line wires.

Alternating current of voltage and frequency suitable for operating the bells via the capacitors is also applied between either line wire and earth. A bell can now be rung only at that station at which (*a*) the voltage on one line with respect to earth is high enough to break down a gas tube; (*b*) such voltage is of the correct polarity; and (*c*) where the two previous conditions operate a relay to the contact of which an alternating potential is applied between the other line wire to earth.

Accordingly, if as indicated above line A is made positive to earth and the A. C. potential is applied between line B and earth, then the bell at the first station will ring. Thus although the gas tube G2 is made conductive by the potential and relay A2 operates, capacitor C2 is connected to line A not line B so that bell B2 is not sounded. Again, the rectifiers M3 and M4 being opposed in polarity to the positive on line A prevent operation of relays A3 and A4. Finally, as no high potential is applied to line B, the gas tubes G5 to G8 remain non-conductive. The bell B1 is therefore rung either continuously or in an interrupted manner (but not so as to give code ringing) until the originating call is either answered or the caller hangs up.

To call party No. 2, positive is once more applied to line A, with alternating ringing current also applied between line A and earth. Rectifier M2 and gas tube G2 become conductive and the relay A2 operates. Ringing current from line A is now applied via C2 to bell B2 with the return via A21 to earth. The bell B2 rings, but no other.

Similar selective actions by combining various conditions of relatively high D. C. potential and alternating potential on the two line wires can be made to ring the remainder of the bells selectively. The potential combinations necessary are as shown in the following table.

| Party No. | Calling conditions, Fig. 1. | | | | | |
|---|---|---|---|---|---|---|
| | H. T. on— | | H. T. Polarity | | Ringing A. C. on— | |
| | Line A | Line B | + | − | Line A | Line B |
| 1 | X | | X | | | X |
| 2 | X | | X | | X | |
| 3 | X | | | X | | X |
| 4 | X | | | X | X | |
| 5 | | X | X | | X | |
| 6 | | X | X | | | X |
| 7 | | X | | X | X | |
| 8 | | X | | X | | X |

In a typical case, the normal line potential between the wires except during calling is 50 volts, the relatively high calling H. T. potential is 120 volts to earth, and the alternating potential is 35 volts R. M. S.

Although the potential and polarity of the originating H. T. signal are shown as affecting two separate devices (a gas tube and a rectifier), these may be replaced by a single asymmetrically conducting gas tube having a much higher conductivity in one direction than the other. The present invention should be understood as including the use of such an asymmetric device.

Referring now to Figure 2, the calling sections of eight subscribers' instruments out of a possible sixteen are shown. The remaining eight subscribers' calling arrangements are similar in all respects to those shown in the figure and are connected to points C and D but with the line wires reversed. Thus the high potential calling condition applied to lead A on the left-hand side of the figure crosses over from point C to the right-hand wire of the subscribers' instruments not shown in the drawing.

Further calling conditions have been introduced into the circuit shown so as to cater for double the previous number of subscribers. The additional conditions consist in the application of a low potential applied between one line wire and earth simultaneously with application of the high potential, between the other line wire and earth, the polarity of the low potential being effective in selecting certain subscribers from a group.

In the lowest section of the drawing is shown the calling apparatus allocated to station No. 1, and this consists as in the arrangement of Figure 1 of a rectifier MA1, gas tube G1 and relay A1 in series between the line wire A and earth. In addition a relay B1 is provided in series with a rectifier MB1 and the contact A11 between the line wire B and earth. Relay A1 closes contact A11 when operated and relay B1 closes contact B11 when operated.

Similar equipment is provided at the other subscribers' stations.

Assuming that a relatively high potential with respect to earth is placed on line A of positive polarity, then all the four gas tubes from G1 to G4 and their series rectifiers become conductive. Relays A1 to A4 operate. If at the same time a relatively low potential of positive polarity is applied between line B and earth, then relays B1 and B2 operate their contacts B11 and B21, closing the circuits of the alternating bells D1 and D2. Application of alternating potential to line A now causes bell D1 to ring, and no other. If the high potential is applied to line B then none of the gas tubes shown in Figure 2 become conductive, but half of the tubes in that part of the circuit not shown, break down and operate their series relays. The accompanying combination of low potential on line A and alternating potential on line A or line B finally selects one subscriber out of the eight not shown. The calling conditions for all subscribers are as shown in the accompanying table.

| Party No. | Calling conditions, Fig. 2. | | | | | | | |
|---|---|---|---|---|---|---|---|---|
| | H. T. on— | | H. T. Polarity | | L. T. Polarity | | Ringing A. C. on— | |
| | Line A | Line B | + | − | + | − | Line A | Line B |
| 1 | X | | X | | X | | X | |
| 2 | X | | X | | X | | | X |
| 3 | X | | X | | | X | X | |
| 4 | X | | X | | | X | | X |
| 5 | X | | | X | X | | X | |
| 6 | X | | | X | X | | | X |
| 7 | X | | | X | | X | X | |
| 8 | X | | | X | | X | | X |
| 9 | | X | | X | | X | | X |
| 10 | | X | | X | | X | X | |
| 11 | | X | | X | X | | | X |
| 12 | | X | | X | X | | X | |
| 13 | | X | X | | | X | | X |
| 14 | | X | X | | | X | X | |
| 15 | | X | X | | X | | | X |
| 16 | | X | X | | X | | X | |

It should be realised that, as in the case of Figure 1, transmitting and receiving equipment, with or without impulse generating equipment, may be provided at each subscriber's station, such equipment being disconnected from both lines when the station is not in use. In order that a subscriber may make a call, a low potential of, say 50 v. is maintained between the line wires at all times when no calling condition is present, this potential being removed and replaced by the various potentials mentioned above when one party is to be called. The calling condition is preferably of a momentary character, repeated if necessary, with intervals of the normal low potential of 50 v. applied to the line wires. This enables the subscriber to signal the exchange by looping the line wires when he replies.

It should be noted that removal of the high potential employed in calling, causes almost immediate disconnection of both line wires from earth, as the gas tube in each instrument then ceases to be conductive, releases its relay, and the contact of the said relay disconnects the corresponding B relay from earth.

We claim:

1. A subscriber's instrument circuit having two terminals for connection to the line wires of a two-wire multi-party telephone line and including a signalling circuit which comprises a signalling device responsive to alternating potential, an electro-magnetic relay, a gas discharge tube and a rectifier element, the relay, the gas tube and the rectifier element being connected in series with one another between one of the terminals and an earth point, the said relay responding upon the application between said one of the terminals and earth of a potential of at least a predetermined value and polarity such as to render conducting both the said gas tube and the rectifier element and having contacts which act when the said relay responds to connect the signalling device between one of the terminals and an earth point, the signalling device responding to only one characteristic combination of said potential and alternating potential occurring simultaneously between the terminals and earth.

2. A subscriber's instrument circuit having first and second terminals for connection to the line wires of a two-wire multi-party telephone line and including a signalling circuit which comprises a signalling device responsive to alternating potential, first and second electromagnet relays, a gas discharge tube and first and second rectifier elements, the first relay, the gas tube and the first rectifier element being connected in series with one another between the first terminal and an earth point, the first relay responding to the application between the first terminal and earth of a first potential of value and polarity such as to render conducting both the gas tube and the first rectifier element and having contacts which act when the first relay responds to connect the series connected second relay and second rectifier element between the second terminal and an earth point, the second relay responding upon the application between the second terminal and earth of a second potential which is low relative to the first potential and which is of polarity such as to render conducting the second rectifier element and having contacts which act when the second relay responds to connect the signalling device between one of the terminals and earth, the signalling device responding to only one characteristic combination of the first potential, the second potential and alternating potential occurring simultaneously between the terminals and earth.

References Cited in the file of this patent

UNITED STATES PATENTS

| | | |
|---|---|---|
| 1,778,768 | Norton | Oct. 21, 1930 |
| 1,804,767 | Hague | May 12, 1931 |
| 1,841,084 | Bragg | Jan. 12, 1932 |
| 1,889,466 | Crowe | Nov. 29, 1932 |
| 2,186,315 | Baloun | Jan. 9, 1940 |
| 2,268,880 | Kusche | Jan. 6, 1942 |
| 2,276,518 | Seiffert | Mar. 17, 1942 |
| 2,788,394 | Barrow et al. | Apr. 9, 1957 |

FOREIGN PATENTS

| | | |
|---|---|---|
| 434,446 | Great Britain | Sept. 2, 1935 |
| 828,722 | Germany | Jan. 21, 1952 |